UNITED STATES PATENT OFFICE.

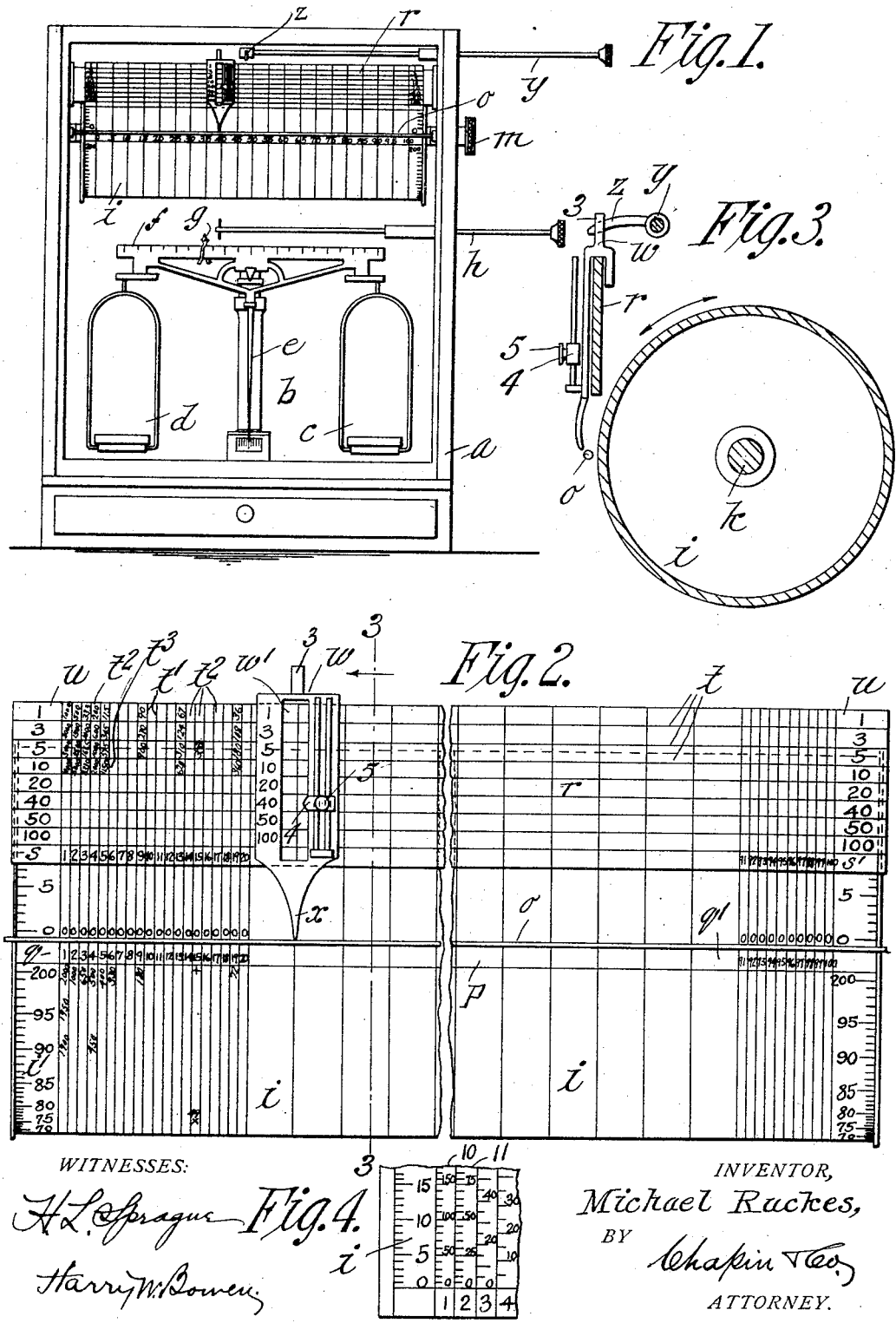

MICHAEL RUCKES, OF CHICOPEE FALLS, MASSACHUSETTS, ASSIGNOR TO NATIONAL SCALE COMPANY, OF CHICOPEE FALLS, MASSACHUSETTS, A CORPORATION OF MASSACHUSETTS.

COUNTING-MACHINE.

1,059,318. Specification of Letters Patent. Patented Apr. 15, 1913.

Application filed January 3, 1912. Serial No. 669,180.

*To all whom it may concern:*

Be it known that I, MICHAEL RUCKES, a citizen of the United States of America, residing at Chicopee Falls, in the county of Hampden and State of Massachusetts, have invented new and useful Improvements in Counting-Machines, of which the following is a specification.

This invention relates to counting machines and has for its object to provide a construction in which a large number of very small pieces, such as watch-screws, may be accurately and rapidly counted without doing it by hand, which would be a very tedious and inaccurate way of counting very small articles.

The invention, in general, comprises a beam balance in one of the scale pans of which is placed, say ten pieces, of the number of articles to be counted, and in the other scale pan the weights used for weighing are placed. The beam of the balance is divided into one hundred equal parts and is preferably called the ratio or per cent. beam. After a balance of the ten pieces is obtained on the ratio beam, this reading of the beam is taken and transferred to a chart device which has a pointer that moves over a scale which is divided into one hundred equal parts. This scale is located adjacent a cylinder chart on which are located figures that indicate the number of pieces that are contained in a given weight of the articles to be counted. The size of the cylinder chart is limited in that it is made so as to count the number of pieces up to a certain weight,—say two grams.

When it is desired to count the number of pieces which are contained in a quantity of the articles which weigh more than the capacity of the cylinder chart, (two grams,) an additional chart is used which is termed the "gram-chart", so that in weighing pieces, the number of which is to be counted, and the weight of which is above two grams, the gram chart and the cylinder chart are both used, as will be further explained.

In the drawings forming part of this application,—Figure 1 is a front elevation of the complete machine showing the ratio balance, gram, and cylinder charts. Fig. 2 is an enlarged, front view in elevation, of the gram and cylinder charts and illustrating the counting figures on these charts; also the movable pointer device that is mounted on, and slides over the gram chart. This pointer device is provided with a reading opening therein through which figures on the gram chart may be read, the pointer member of which lies over the cylinder chart. Fig. 3 is a transverse, sectional elevation on the line 3—3, Fig. 2, looking in the direction of the arrow, showing the relative location of the two charts. Fig. 4 is a detail view on an enlarged scale of a developed portion of the cylindrical chart on the zero line illustrating the manner in which the numbers on this chart are worked out.

Referring to the drawings in detail, $a$ designates a suitable frame in the lower part of which is placed the balance scales, indicated as a whole by the letter $b$, which balance comprises scale pans $c$ and $d$.

The pointer of the balance is indicated by $e$ and the beam at $f$. This beam is provided with a rider or poise $g$ which is moved from one end of the beam to the other by means of the rider gage or adjusting rod $h$.

Mounted in the frame, above the balance $b$ is the cylinder chart $i$ which is mounted for rotation in the frame $a$ by means of the shaft $k$ having a knob $m$ at its outer end for rotating the cylinder when a reading is to be made. Extending across the frame and in front of the cylinder chart $i$ is a horizontally arranged wire $o$, and placed on the cylinder chart $i$ and extending across the same on the line $p$ are figures from 1 to 100, as indicated at $q$ and $q^1$. This line with the numerals 1 to 100 may be called a ratio line to be used in connection with the divisions of the beam $f$, as will be explained.

Located above, and in front of, the cylinder chart $i$ is a member $r$, shown clearly in Fig. 3, which is termed the gram chart. The lower edge of this member has placed thereon numerals extending from 1 to 100, as indicated at $s$ and $s^1$, and these numerals correspond or agree with those at $q$ and $q^1$. This line of figures may also be termed the ratio line, which agrees with the line $p$, whereon are placed the numerals 1 to 100 as mentioned above. The member $r$ has extending across it in a horizontal direction a series of lines $t$. Arranged in a vertical position above each other and on the lines $t$ and at the end of the chart $r$ are figures in the columns $u$, which figures, as shown, are— 1, 3, 5, 10, 20, 40, 50, and 100, meaning that these figures are to be used when it is desired to count the number of pieces which weigh more than two grams, as the number of pieces contained in two grams can be counted on the cylinder chart $i$.

Slidably mounted on the gram chart $r$ is an open frame $w$, the opening being indicated at $w^1$. The lower end of the slidable frame is provided with a pointer $x$ which terminates adjacent the wire $o$. The frame $w$ is adjusted from one end of the grain scale $r$ to the other by means of a rod $y$ to which is attached an arm $z$ that engages an upwardly extending part 3 of the frame $w$. Slidably mounted on the frame $w$ is a pointer or index finger 4 adapted to be secured in various vertical positions of adjustment by means of a set-screw 5. The pointer 4 extends into an opening $w^1$, as shown in Fig. 2. The gram chart $r$ is divided into rectangular spaces by means of the horizontal lines $t$, and the vertical lines $t^1$. Placed within these rectangular spaces, designated by the letter $t^2$, are figures which indicate the number of pieces that are contained in a given weight, as for example 1150 are contained in 10 grams, where the ratio reading is five one-hundredths of a gram; that is to say, where the lines $t$ and $t^1$ cross, as indicated at $t^3$. Of course the number that is in these spaces varies with their position with reference to the horizontal and vertical lines; that is to say, the square that occurs where these lines intersect will contain a number that indicates the number of pieces for that particular weight, as will be more fully described. The cylinder chart $i$ has placed thereon, at its opposite ends, numerals reading from zero to 200, the 200 indicating two grams, and for any quantity of small articles that weighs more than two grams; reference is made to the gram chart $r$ which is used in connection with the cylinder chart $i$ for the number of pieces in the fractional parts of a gram.

Having described the construction of the counting scale, the manner in which the machine is used for counting or ascertaining the number of articles in a given weight will now be described: First, ten pieces of the articles from the bulk the whole number of which it is desired to determine are counted out; then these ten pieces are placed in one of the scale pans, say $d$, of the balance $b$. The rider or poise $g$ on the scale beam $f$ is moved until a balance is obtained by observing the pointer $e$ when in its zero position; this reading is then taken from the beam $f$, say 15, which means that the ten pieces weigh fifteen one-hundredths of a gram, as the beam $f$ is so graduated that with the poise $g$ at the end of the beam there is a weight of one gram in the opposite pan. This is the ratio reading for the ten pieces. The next step is to weigh the full load by placing the bulk or quantity of small articles that are to be counted in the scale-pan $d$ and obtain a balance by placing weights in the other scale-pan $c$ and adjusting the poise $g$ until the pointer $e$ comes to rest at zero. Weights are placed in the pan $c$, if the bulk that is to be counted weighs more than two grams, as for instance 5 grams may be required to be placed in the pan $c$ and if the poise reading is 75, it would mean that the bulk weight is, five and seventy-five one-hundredths grams which is the total weight of the bulk. As this weight is more than two grams, the number of pieces can not be counted on the cylinder chart $i$. Reference is therefore had to the gram chart $r$, the frame $w$ having previously been placed so as to show the numeral 5 through the opening $w^1$. We now follow along the line from the 5 in the space $u$ to the column 15 (the ratio weight) and find the reading 333, which is the number of pieces for five grams. To find the number of pieces in seventy-five one-hundredths of a gram, the cylinder chart $i$ is rotated so that the wire $o$ crosses the numeral 75 in the load or weight column $i^1$ on the cylinder chart $i$, at the end thereof, where we find that this reading is forty-nine. Therefore adding 333 and 49 together gives the total number of pieces in five and seventy-five one-hundredths grams, viz.,—382. It is evident that this machine may be used to count the number of pieces in a definite weight by simply working it backward.

It should be mentioned that if the balance $b$ does not come to the zero reading, when the ratio number of ten pieces is placed in the scale-pan on one of the divisions of the beam $f$, it is better to use a larger number of pieces, say 20 instead of 10, to obtain the ratio; but in using the scale with this ratio care should be taken to double the counting and the cylinder on the gram chart.

The numerals on the cylinder chart $i$ and the gram-chart $r$ are obtained as follows: It will be observed that there are numerals reading from 0 to 200 on this cylinder. These numerals represent or stand for centigrams and since there are 100 milligrams in one gram, each division must stand for one milligram. In the column indicated at 10 in Fig. 4, the numerals correspond to those in the load or weight column $i^1$ since the numeral 1 at the bottom of the column 10 is for one milligram or one one-thousandth of a gram, which, in turn, corresponds to the ratio line $q$—$q^1$ on the cylinder chart $i$, or the ratio line $s$ on the gram chart $r$. The number of pieces opposite "5" in the column $i^1$ must therefore be 50 in the column 10, if one piece weighs 1 milligram. The number opposite 200 in the column designated 10, is therefore 2000. It therefore follows that in the column 11, in Fig. 4, (which is the ratio column for two one-hundredths of a gram) the numbers are just one-half in this column as for example, opposite 50 in the column designated 11, we find 25, and opposite 200 in the column designated $i$, in the column designated 11, we find 1000, and so on, for the whole cylinder chart $i$. The numbers in the squares $t^2$ of the gram chart $r$ are, of course, easily computed, as for example, opposite "1" in the $u$ column, occurs 1000, which is the number of pieces in a gram, opposite the number opposite the numeral "5" on the $u$ column, is, of course 5000. The unit of weight of the system of counting is the milligram, that is to say, the smallest piece that can be weighed is one milligram.

What I claim, is:—

In a counting machine, the combination, with a suitable frame, a cylindrical member rotatably mounted in the frame and provided with numerals arranged in columns around its surface, an alining device carried across the frame in front of the cylinder to designate the numerals thereon which indicate the number of individual pieces in a definite weight, as grams or fractional parts of a gram, a fixed member secured to the frame and adjacent the cylindrical member and provided with numerals located in spaces formed by intersecting lines on the surface to indicate the number of pieces in weights of whole numbers, a frame slidably mounted on the fixed frame and formed with an opening therethrough, a pointer movable with the slidable frame and extending to the alining device, an index finger adapted to be adjusted to different positions over the opening in the slidable frame whereby when the pointer is moved to a number which indicates the number of pieces in a fractional weight on the cylindrical member and the index finger to a whole number on the fixed frame, the total number of pieces in the weight may be determined by adding together the number of pieces designated on the cylindrical or fractional chart and the fixed chart.

MICHAEL RUCKES.

Witnesses:
HARRY W. BOWEN,
FRANKLIN G. NEAL.